United States Patent
Khong

(10) Patent No.: US 9,109,535 B2
(45) Date of Patent: Aug. 18, 2015

(54) PROPULSION SYSTEM AND METHOD

(76) Inventor: Thuan Huu Khong, Hampton, VA (US)

( * ) Notice: Subject to any disclaimer, the term of this patent is extended or adjusted under 35 U.S.C. 154(b) by 1004 days.

(21) Appl. No.: 12/799,878

(22) Filed: May 3, 2010

(65) Prior Publication Data

US 2011/0268581 A1  Nov. 3, 2011

(51) Int. Cl.
  *F02K 7/00* (2006.01)
  *F01D 1/32* (2006.01)
  *F02C 3/16* (2006.01)

(52) U.S. Cl.
  CPC . *F02K 7/005* (2013.01); *F01D 1/32* (2013.01); *F02C 3/165* (2013.01)

(58) Field of Classification Search
  CPC ............... F02K 7/02; F02C 3/16; F02C 5/04; F02C 3/165
  USPC .......... 60/39.17, 200.1, 39.34, 39.35, 39.163
  See application file for complete search history.

(56) References Cited

U.S. PATENT DOCUMENTS

| | | | | |
|---|---|---|---|---|
| 2,709,889 A * | 6/1955 | Mount | ............................ | 60/201 |
| 2,831,320 A * | 4/1958 | Duncan | ........................... | 60/201 |
| 2,924,937 A * | 2/1960 | Leibach | .......................... | 60/804 |
| 3,354,636 A * | 11/1967 | Utrup et al. | ................... | 60/39.35 |
| 5,138,831 A * | 8/1992 | Cowan, Sr. | .................... | 60/39.34 |
| 5,660,038 A * | 8/1997 | Stone | ............................ | 60/39.35 |
| 6,988,357 B2 * | 1/2006 | Dev | ............................. | 60/39.43 |
| 7,784,260 B2 * | 8/2010 | Spalton | ...................... | 60/39.163 |
| 2002/0125340 A1* | 9/2002 | Birch et al. | ............... | 239/265.11 |
| 2009/0007569 A1* | 1/2009 | Lemmers et al. | ............... | 60/792 |

* cited by examiner

*Primary Examiner* — Gerald L Sung
(74) *Attorney, Agent, or Firm* — Bradley Goldizen

(57) ABSTRACT

A rotating engine produces a torque created by exhaust products routed through angled nozzles exiting the nacelle. In one instance, a hollow drive shaft includes a plurality of fuel injector nozzles through which pressurized fuel is fed into an ignition chamber and ignited. Exiting exhaust is directed to cause the nacelle to spin. This spinning motion of the nacelle is harnessed to perform electrical or mechanical work.

15 Claims, 6 Drawing Sheets

PROPULSION SYSTEM AND METHOD

TECHNICAL FIELD

The present invention generally relates to a propulsion system for powering a system. The system may be utilized to drive a variety of devices including an aerial vehicle. In one instance, the propulsion system comprises a ramjet type engine that ignites fuel within a combustion chamber surrounded by a rotating nacelle housing. Exhaust by-products are routed through angled exhaust nozzles radially arranged about the nacelle housing to cause it to spin thereby exerting a torque on a drive shaft which is coupled to the nacelle housing. Work is performed by capturing the force of the combustion through the exhaust exiting the nacelle and external of the combustion chamber. Various devices such as gears, motors, etc. may be coupled to the drive shaft to operate the system. The system may comprise any device that may be used to harness and create electrical or mechanical energy.

BACKGROUND OF THE INVENTION

An internal combustion engine is an engine having a combustion chamber into which fuel and an oxidizer are directed and combusted. High pressure gases are applied to movable components of the engine, which are harnessed to do work. For instance, gasoline is mixed with air in the cylinders of an automobile engine and ignited by spark plugs to drive a crankshaft during operation of the automobile. Pressure is exerted against the piston heads within the combustion chambers.

Another type of engine is a ramjet. A ramjet has no moving parts and achieves compression of intake air by the forward speed of the aerial vehicle to which it is attached. High pressure is produced by "ramming" external air into a combustor using the forward speed of the vehicle. Air entering an intake of a supersonic aircraft is slowed by aerodynamic diffusion created at the air intake or inlet and diffuser. The speed of the air is slowed to velocities comparable to those in a turbojet engine. The expansion of hot gases after fuel injection and combustion accelerates the exhaust air to a velocity higher than that at the inlet and creates positive push. In a turbojet engine, the high pressure in the combustor is generated by a compressor. The lack of a compressor in a ramjet renders it lighter and simpler in operation than a turbojet. One drawback to a ramjet is that it only produces thrust when the engine is already moving forward relative to the surrounding ambient air.

Scramjet is an acronym for Supersonic Combustion Ramjet. The scramjet differs from the ramjet in that combustion takes place at supersonic air velocities through the engine. It is mechanically simple, but more complex aerodynamically than a jet engine. Hydrogen is normally the fuel used. Because the scramjet uses external air for combustion, it is a more efficient propulsion system for flight within the atmosphere than a projectile, which must carry all of its oxygen. Scramjets are ideally suited for hypersonic flight within the atmosphere.

SUMMARY OF THE INVENTION

The present invention is a novel type of rotating engine that produces torque via the exhaust products through respective exhaust nozzles. The torque and rotation of the rotating engine is outputted to drive other devices or machine parts. The engine is started by a starter similar to that in a car engine or by any other means which starts the rotation of the engine. That is, any motor, engine, or other rotating means may be utilized in starting the present engine. Otherwise, the engine may be configured as secondary propulsion system on a moving aircraft. In one instance, a mixture of air and fuel is pumped into the combustion chamber and ignited to start the rotating engine. When the rotating engine rotates, fan blades draw air into the engine which is then mixed with fuel and pumped into the combustion chamber. The combustion by-products, for example the burning fuel and air, produces a torque via angled exhaust nozzles radially arranged about the nacelle of the rotating engine.

As mentioned above, a conventional jet engine produces thrust, while the rotating engine produces torque. Another difference between the instantly claimed invention and a conventional jet engine is that the nacelle of a conventional jet engine is rigidly fixed to the frame of the vehicle to which is attached. The nacelle of the rotating engine rotates via the angled exhaust nozzles and is coupled to a drive shaft to which other devices for operating the aircraft may be coupled. A connecting member or rod is attached between the nacelle and the drive shaft for transferring torque there between. The drive shaft may be hollow and include a plurality of injection ports for injecting fuel into the combustor. The connecting member connects the drive shaft to the nacelle to make the engine structurally stiff. Thus, the connecting rods may be attached to a collar and to the nacelle. The collar wraps around the rotating shaft (with or without bearings being arranged between the collar and the rotating shaft), and the rotating shaft can be arranged to rotate freely with respect to the collar. The connecting rods are optional, depending on whether the fan blades are rigidly attached to the rotating shaft and to the nacelle. If the fan blades are rigidly attached to the rotating shaft and to the nacelle, connecting rods for structurally stiffening the engine may be unnecessary. The fan blades may be rigidly attached to the nacelle and the rotating shaft. The fan blades may be rigidly attached to the nacelle and rigidly attached to a collar, which freely rotates with respect to the rotating shaft. The fan blades and the collar may slide along the rotating shaft. The fan blades may be rigidly attached to the rotating shaft, but not rigidly attached to the nacelle. Fuel can be injected into the combustion chamber via injection ports arranged on the hollow connecting rods, fan blades or injection ports on the nacelle. Fuel may be mixed with air before the mixture enters the inlet of the engine. Otherwise, an oxidizer (such as air) and fuel may be mechanically pumped into the combustion chambers and ignited.

As can be recognized by those skilled in the art, the rotating engine may be coupled to the aircraft to exert a torque onto the vehicle to produce a spin. Thus, if the rotating jet engine is coupled to a projectile, a torque may be exerted onto the body of the projectile to spin the projectile. As can be recognized, the engine can be utilized to generate angular momentum if the engine is not rigidly attached to an aerial vehicle. There are many other possible applications if the rotation of the engine is utilized rather than the torque provided by the engine.

An object of the invention is to provide an engine that includes a plurality of novel exhaust nozzles which create a torque on a drive shaft.

A further object of the invention is to provide a propulsion system having a ramjet style engine that includes a rotating nacelle having exhaust nozzles extending radially therefrom.

Another object of the invention is to teach a propulsion system having one or more selected from a group consisting of a hollow drive shaft, a hollow fan blade, or a hollow connecting rod through which fuel is routed prior to ignition within the engine.

A further object of the invention is to teach a novel method and system for creating a torque on a drive shaft which drives a plurality of other devices such as electric motors or pumps.

A further object of the invention is to provide an engine that exerts a torque on a body.

Additional objects and advantages of the invention will be set forth in part in the description which follows, and in part will be obvious from the description, or may be learned from practicing the invention. The objects and advantages of the invention will be obtained by means of instrumentalities in combinations particularly pointed out in the appended claims.

DESCRIPTION OF THE DRAWINGS

In FIG. 2A, the fan blades are not rigidly attached to the nacelle. It should be noted that drive shaft and rotating shaft are used interchangeably throughout this disclosure. In FIG. 2A, the bottom part of the shaft is referred to as the drive shaft whilst the upper part of the shaft is a rotating shaft which can rotate freely with respect to the nacelle.

In FIG. 3A, the fan blades are not rigidly attached to the nacelle.

DETAILED DESCRIPTION OF THE INVENTION

Figure 1A:
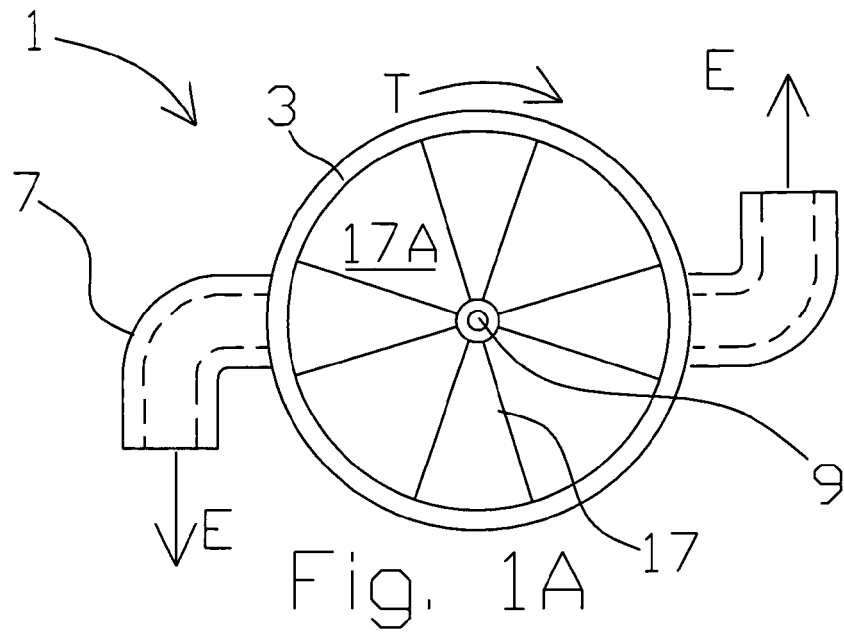
FIG. 1A is a top view of a first embodiment of the invention showing the various parts.

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention.

Accordingly, the examples and embodiments set forth herein should not be construed as limiting the scope of the invention, which is defined by the appended claims. Moreover, it is noted that like reference numerals represent similar parts throughout the several views of the drawings.

The vehicle constituting the present invention employs a rotating engine having a hollow drive shaft having fuel injection openings arranged within a combustion chamber. Other hollow elements may be substituted for injecting the fuel into the combustion chamber and include fuel injector openings as previously discussed. Exhaust by-products created from burning the fuel are directed through angled exhaust nozzles to create a torque on the engine. A drive shaft receives the torque and relays it to other mechanisms exterior to the engine.

A fan is provided for forcing air into the combustion chamber within the engine. The fan comprises blades which have angles of attack which cause air to be drawn into the jet engine when it is operated. That is, fuel is mixed with air when the air is drawn into the jet engine or fuel droplets are pumped into the jet engine through the hollow drive shaft. In one instance, the fan may be rigidly affixed to the drive shaft. In another instance, the fan is rotated by a turbine attached to the rotating shaft. Torque produced by the driving shaft may be outputted and harnessed to operate other mechanical and electrical devices including a driven shaft that is rotated by the driving shaft. In one instance, the fan may operate at a different angular speed than that of the rotating shaft. Likewise, the rotating or driven shaft may be coupled to the drive shaft via a rotational transmission device that increases or decreases the angular velocity of the drive shaft. In another instance, the fan blades attach to a collar that is free to rotate about the rotating shaft. The relative angular speed of the rotating shaft and the collar may be adjusted via a planetary gearbox or an electric motor. The gearbox, collar, and fan blades may slide up and down the rotating shaft to increase the efficiency of the engine. The connecting rods couple the drive shaft to the wall of the nacelle to stiffen the overall structure of the rotating jet engine. Other mechanical drive methods may include a rotating shaft connected to the drive shaft via a clutch and/or torque converter.

Figure 5:
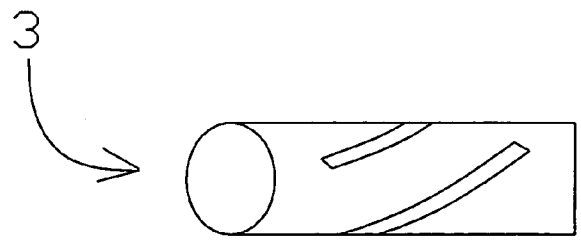
FIG. 5 is a perspective view of an open vane nacelle that may be utilized in realizing the present invention.

Various other design features may be implemented in the invention without deviating from the scope of the invention. For example the shape and size of the air inlet for the rotating jet engine may be manipulated. The shape of the nacelle may be varied to be extended to cover all or part of the legs to reduce aerodynamic drag. The shape of the inner wall of the nacelle may be varied. An open vane design, as shown in FIG. 5, may be utilized in implementing the invention. The number of the nozzles may be varied along with the diameter of the exhaust opening and the lengths of the moment arms with respect to the center line of the drive shaft. The orientation of the exhaust ends of the legs may be varied by including different angles and curved regions in the legs. The quantity of the fan blades, the shape of the cross sections of the fan blades, various angles of attack of the fan blades, distribution of the fan blades, location of the fan blades, may all be varied. The moment of inertia with respect to the center line that extends from the front to rear of the engine may also be varied. The method of injecting fuel into the jet engine may be varied including how the fuel droplets are pumped into the engine either through the hollow drive shaft or into the air inlet. The angles of attack of the fan blades are constants or functions of the rotating speed of the jet engine through mechanical links or electrical control devices. The aforementioned design parameters may be optimized to maximize the efficiency of the rotating jet engine, the torque output, power output and operating costs including fuel consumption. Other design issues that may be considered include cooling the nacelle and fan blades, reducing vibration and noise of the engine and producing clean exhaust by-products. A fly wheel may also be attached to the drive shaft of the rotating jet engine to keep the momentum of the jet engine steady during idling operations. Potential applications for the rotating jet engine include automobile engines, motors, or any other machines requiring work that utilizes torque. Industrial applications may be the automobile industry, ship building industry, airplane industry, mechanical motor industry or the like.

Figure 1B:
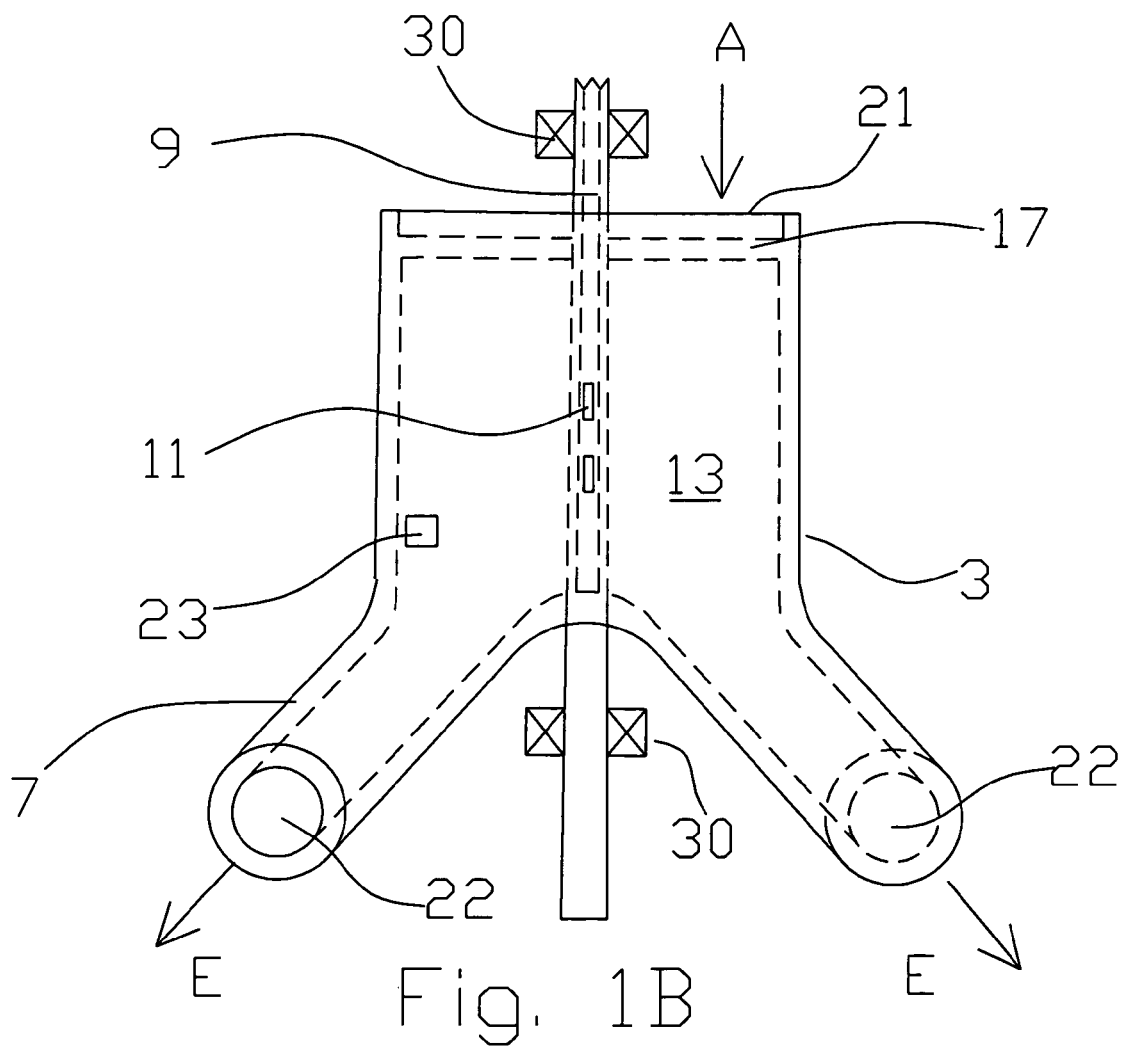
FIG. 1B is a front view of FIG. 1A.

Referring now to FIG. 1A, in its simplest form, the rotating jet engine 1 includes a hollow drive shaft 9 that extends from a forward end of the engine which includes an air intake or inlet 21 and an aft end of the engine that includes exhaust openings 22. See also FIG. 7. Bearings 30 are disposed along the shaft 9 exterior to nacelle 3 for coupling the engine 1 to the apparatus to which it is coupled. Fan 17 is arranged at the air inlet 21 for drawing air into the engine for combustion purposes as can be understood when viewing FIGS. 1B, 2B, and 3B. The vanes or fan blades 17 are oriented with an angle of attach to draw air into the engine when operated.

Figure 2A:
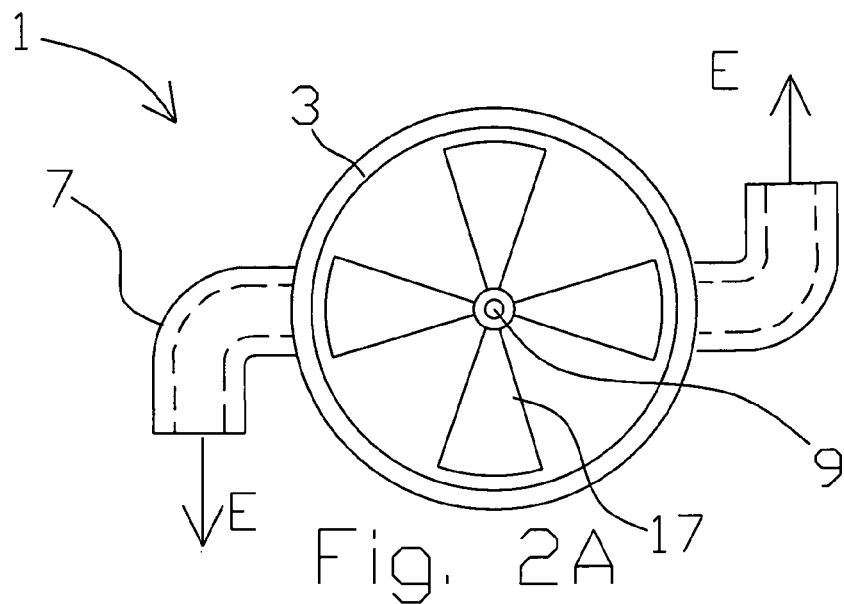
FIG. 2A is top view of a second embodiment of the invention showing the various parts.
Figure 2B:
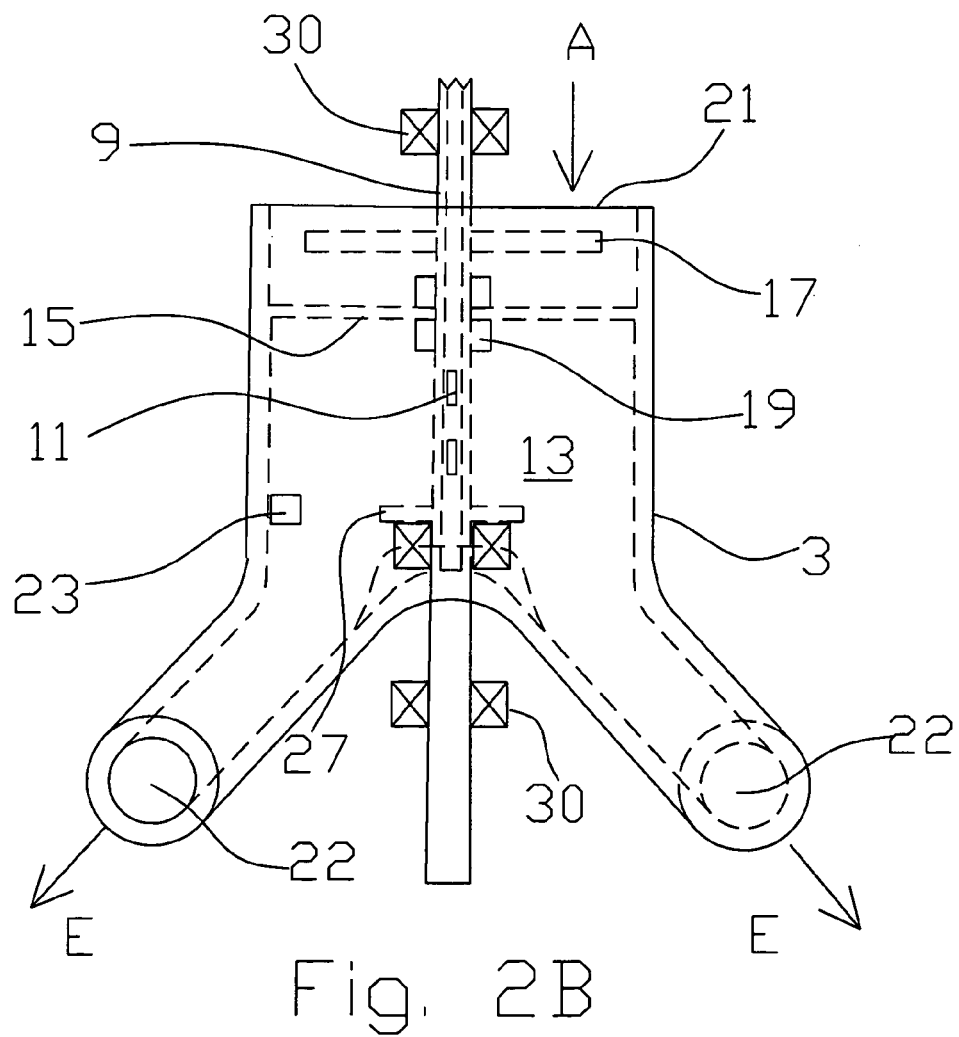
FIG. 2B is a front view of FIG. 2A.

Fuel is directed into the nacelle 3 and combusted by ignitor 23 along with the air drawn in by the fan 17 as indicated by arrow A. In one instance, the fuel may be pumped into combustion chamber 13 via openings 11 in the hollow drive shaft 9 which may comprise a solid portion substantially towards the aft end of the motor or may be coupled to another shaft such as in FIGS. 2A-3B, 6, 7. Exhaust by-products, generally indicated by arrow E, are directed through the legs 7 to cause a torque, represented by arrow T to be exerted onto the nacelle 3. The legs extend perpendicular to an overall length of the nacelle and are arranged with exhaust nozzles at substantially ninety degrees to the axial length of the nacelle and a horizontal distance defined between the exhaust nozzles 22. In FIG. 2A, the fan 17 rotates freely with respect to the nacelle 3. Nacelle 3 fixedly attaches at opposite ends to the drive shaft 9. Connecting rod 15 is shown being fastened between a drive collar 19 and the nacelle 3 substantially near the forward end of the engine 1 in FIG. 2A. The drive collar 19 is arranged about a portion of the hollow drive shaft 9 and rotates freely thereabout. A turbine 27 rigidly attaches to the hollow drive shaft 9 substantially near the aft region and may be utilized to turn the fan blades. The remaining portions of the engine 1 are substantially the same as that with respect to FIG. 1A.

Figure 3A:
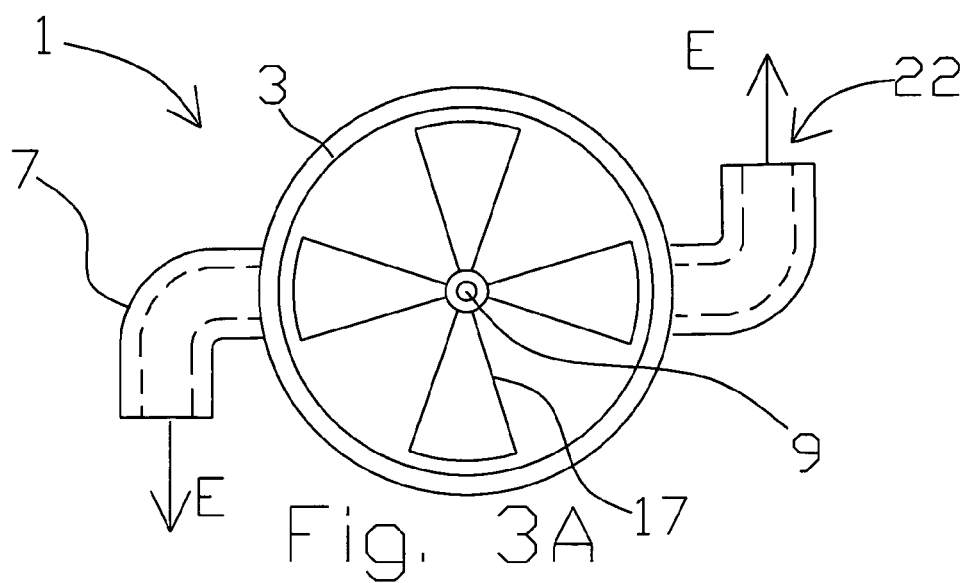
FIG. 3A is a top view of a third embodiment of the invention showing the various parts.
Figure 3B:
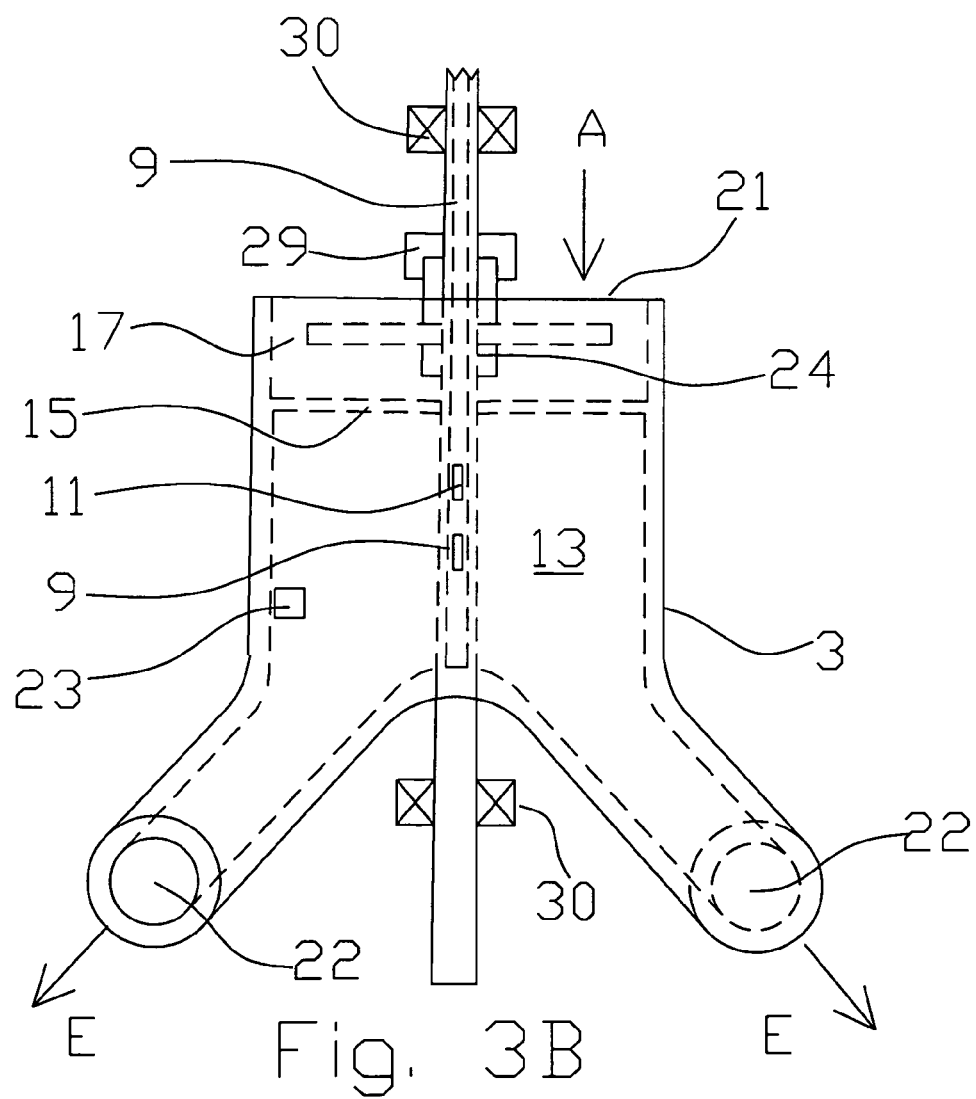
FIG. 3B is a front view of FIG. 3A.

Referring now to FIG. 3A is a cross section view of the rotating jet engine 1 that includes nacelle 3. Angled exhaust nozzles 22 extend radially outward from nacelle 3 via legs 7. As can be recognized by FIG. 3, the legs 7 preferably comprise a right angle. However, it can be realized that any angle between zero degrees and one hundred-eighty degrees may be utilized in implementing the invention.

The engine 1 includes a hollow drive shaft 9 which comprises fuel injection ports 11 that route fuel into combustion chamber 13. A connecting rod 15 couples nacelle 3 to drive shaft 9. Bearings 30 are arranged at opposite ends of the drive shaft 9 for stabilization purposes. A fan 17 that may include collar 24 is arranged at an inlet 21 through which air passes in the direction of arrow A. Exhausts, represented by arrows E, exit the nacelle 3 after combustion of the fuel by ignition 23. A gearbox 29 is arranged along the drive shaft 9 for harnessing the torque created along the drive shaft 9. Otherwise, a rotor of an electric motor may be disposed along the drive shaft and coupled thereto. A stator of the electric motor may be arranged about the rotor for producing electrical energy during operation of the jet engine 1.

The engine 1 may be coupled to a rocket or other aerial vehicle. In this instance, control surfaces are arranged aft the rotating jet engine 1. However, it can be recognized that the rotating jet engine 1 may be arranged aft the payload of the projectile and the control surfaces. One can recognize that as the nacelle spins in one direction, the other portions of the projectile body may be spun in an opposite direction to stabilize the flight path of the projectile.

A planetary gearbox 29 may be arranged with a drive gear coupled onto the drive shaft 9. It may also be recognized that the drive shaft may include a rotor coupled thereto and arranged within a stator to create a motor for producing electricity that aids in operational control of the engine 1 and any associated components or systems.

Figure 6:
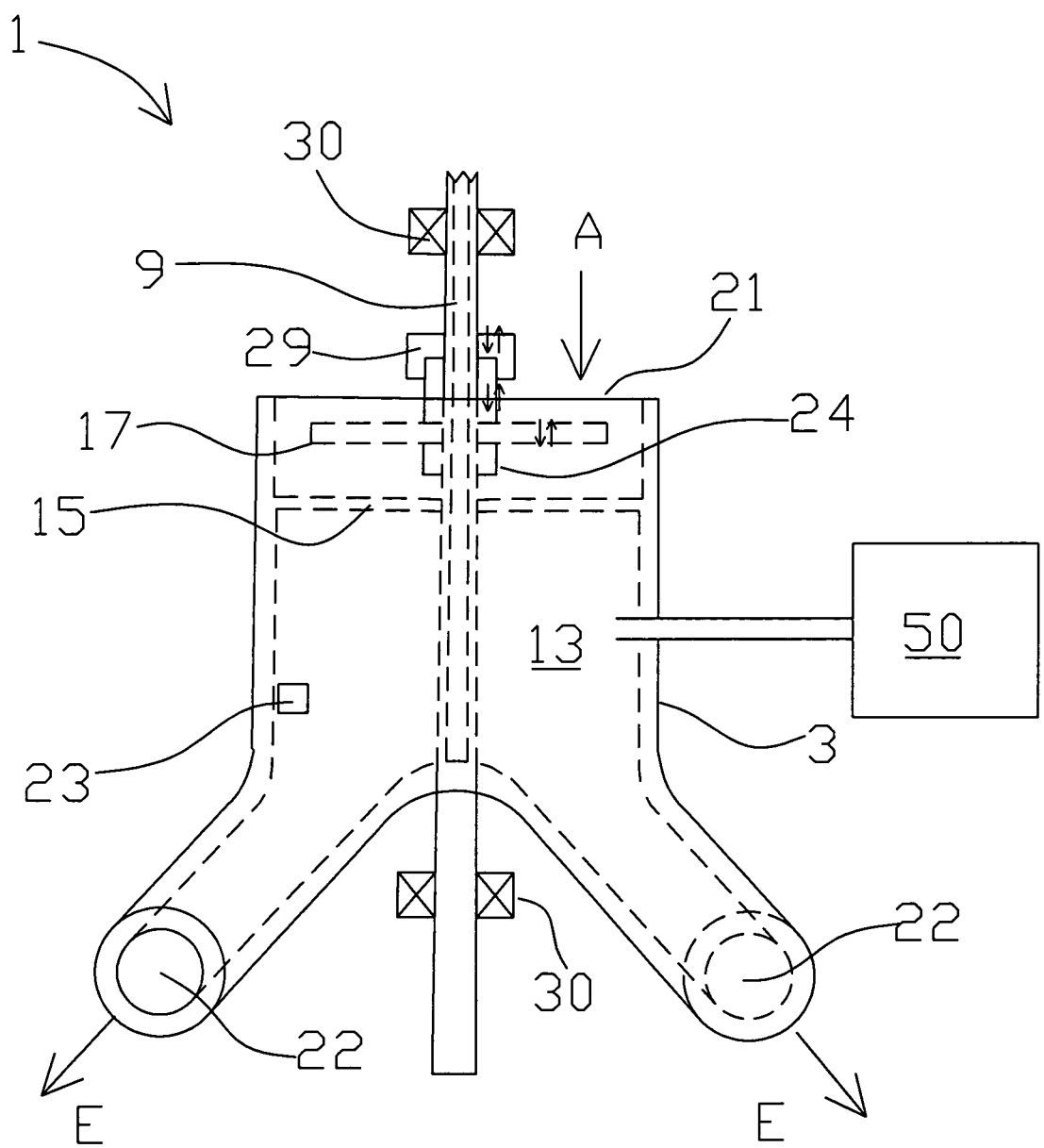
FIG. 6 is an alternative embodiment wherein fuel and air are mechanically pumped into the combustion chamber.

In this first embodiment of the invention, the rotating jet engine is rigidly attached to the rotating shaft and fan. In an alternative embodiment, the rotating jet engine is not rigidly attached to the rotating shaft and to the fan. The fan may be rigidly attached to the rotating shaft. In this instance, the fan and rotating shaft may rotate at a different speed than that of the nacelle. Likewise, the various embodiments may be modified to include a pumping mechanism 50 that pumps fuel into the combustion chamber as shown in FIG. 6 or in the alternative the combustion chamber may be arranged within pumping mechanism 50 and the exhaust gases passed into the nacelle 3 and out through the exhausts 22.

Figure 4A:
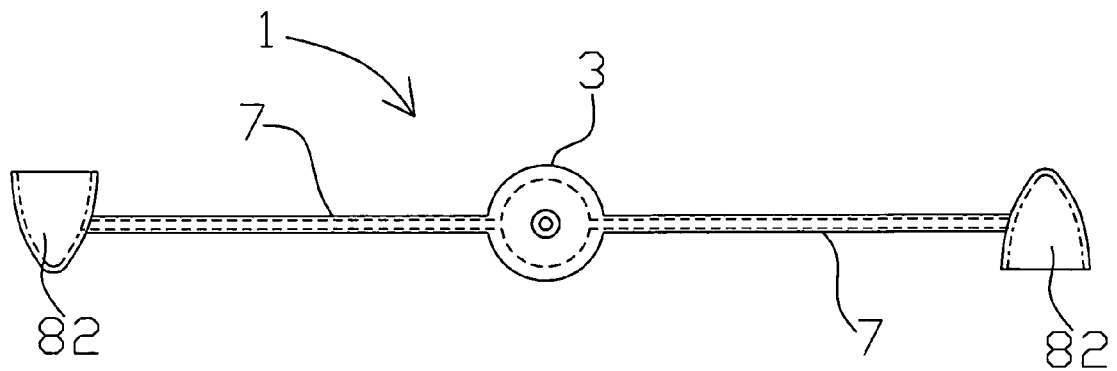
FIG. 4A is a top view of a fourth embodiment of the invention showing the various parts.
Figure 4B:
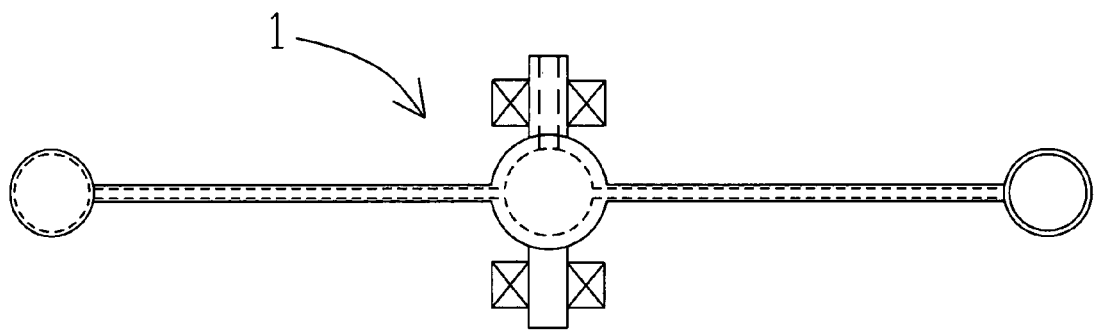
FIG. 4B is a front view of FIG. 4A.

As recognized by FIGS. 4A and 4B, an alternative embodiment of the invention may be realized. In this instance, the conical shaped exhaust ports 82 are arranged at opposite ends of extended legs for directing exhaust gases to cause the rotating combustion engine to spin about an axis. The rotating combustion engine produces torque via the exhaust products routed through the exhaust nozzles 82. This torque and rotation can be harnessed to drive other machine parts. Air and fuel droplets are pumped into the combustion chamber and ignited. In a conventional engine, translational motion of a piston is transformed into rotational motion via a crank shaft. In the instant invention, the engine rotates by the torque created from the exhaust products. As can be recognized, certain design parameters may be manipulated to achieve various results. For example, the inner and outer shape of the hollow tubes connecting the combustion chamber to the exhaust nozzle may be varied as well as the inner and outer shape of the exhaust nozzles. The internal shape of the exhaust nozzles and the nacelle may be manipulated to maximize the efficiency of the engine; whilst the outer shape of the exhaust nozzles may be manipulated to reduce aerodynamic drag. The orientation of the nozzles may be varied to minimize drag. Multiple combustion chambers may be located at various regions along the engine. Valves can be installed to ensure that the exhaust products reach a desired pressure level before being routed through the nozzles. Other design considerations may include engine cooling, reducing engine vibration, and production of cleaner exhausts. As mentioned, a fly wheel may be attached to the engine for maintaining momentum during idling operations. The rotating combustion engine may be used as a car engine, a motor, or in any setting requiring torque. Industrial applications may be in the automobile industry, ship building industry, airplane industry, mechanical motor industry or the like.

Figure 7:
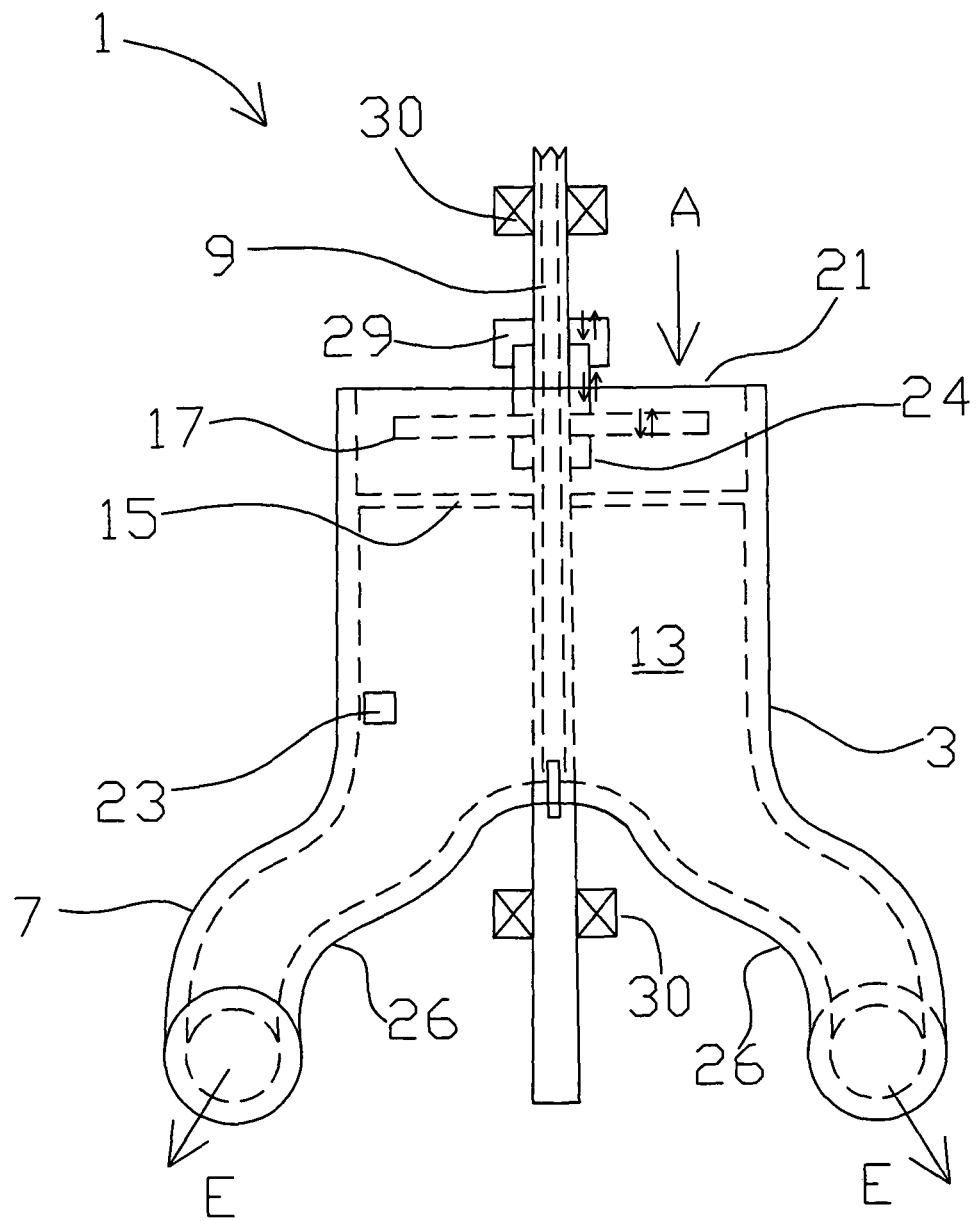
FIG. 7 depicts a different shaped exhaust for the engine.

The alternative shape shown in FIG. 7 include legs 7 that comprise an obtuse angle 26 as shown. It should be noted that from the front end of the system to the mid-region or "waist" and from the "waist" to the leg(s) can rotate at different speeds. That is different regions of the nacelle may rotate at different speeds depending upon the configuration of the system. It is to be understood that the invention is not limited to the exact construction illustrated and described above, but that various changes and modifications may be made without departing from the spirit and the scope of the invention as defined in the following claims. For instance, the invention contemplates an engine with a rotating nacelle which is not found in the prior art. It is readily recognizable that the shape and angle of exhaust nozzles may vary greatly in shape without departing from the spirit of the invention. While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A propulsion system comprising an engine having a rotating nacelle, a length of the nacelle formed along a longitudinal axis of the engine, said engine comprising: a rotating nacelle having at least one angled exhaust nozzle coupled to an end of a leg that expels exhaust gas radially outward, said leg having an input end arranged within the combustion chamber and an output end arranged external to and radially about the nacelle to cause the nacelle to spin thereby creating a torque which is harnessed to perform work; a combustion chamber that accepts fuel from a fuel source having an exhaust that directs by-products of any combustion occurring within the combustion chamber into the at least one angled exhaust nozzle, said by products exiting the engine through the angled exhaust nozzle, at least one connecting rod having two ends and connected at one end to the rotating nacelle; and a drive shaft coupled to the other end of the at least one connecting rod opposite the nacelle, a fan located at a position along the longitudinal axis of the engine upstream from the leg.

2. The propulsion system of claim 1 wherein the combustion chamber is arranged within the rotating nacelle.

3. The propulsion system of claim 1 wherein the drive shaft is hollow and includes a plurality of injection ports for injecting fuel into the combustion chamber.

4. The propulsion system of claim 1 further comprising said engine having a collar that wraps around a rotating shaft connected to the drive shaft.

5. The propulsion system of claim 4 further comprising bearings arranged between the collar and the rotating shaft.

6. The propulsion system of claim 1 further comprising a gearbox arranged along the drive shaft for harnessing the torque created along the drive shaft.

7. An engine having a rotating nacelle, a length of the nacelle formed along a longitudinal axis of the engine, said engine comprising a combustion chamber having an ignition source and an exhaust; a fuel source coupled to the combustion chamber via a conduit and providing fuel to the combustion chamber; a rotating nacelle through which exhaust from the combustion chamber is directed; at least one exhaust portal arranged in said rotating nacelle and directing exhaust from the combustion chamber to the exterior of the rotating nacelle to cause the rotating nacelle to spin; and a leg that extends from the combustion chamber to the at least one exhaust portal arranged in said rotating nacelle to expel exhaust gas radially outward of the nacelle; a fan located at a position along the longitudinal axis of the engine upstream from the leg.

8. The engine of claim 7 further comprising a drive shaft coupled to the rotating nacelle.

9. The engine of claim 7 further comprising a planetary gearbox.

10. The engine of claim 9 further comprising said planetary gearbox that comprises a generator connected to the drive shaft to produce electricity.

11. The engine of claim 7 further comprising a fuel supply line coupled at an input to the fuel source and having an output within the combustion chamber.

12. The engine of claim 7 further comprising a fuel supply line comprising a hollow tube that extends between the fuel source and the combustion chamber and having fuel injector openings arranged within the combustion chamber and expelling pressurized fuel during operation of the rotating nacelle.

13. The engine of claim 7 having a conical shaped exhaust arranged at the at least one exhaust portal.

14. A method of operating a propulsion system comprising: providing a propulsion engine having a rotating nacelle, a length of the nacelle formed along a longitudinal axis of the engine; igniting a fuel arranged within the propulsion engine; and exhausting a combustion product through a leg that expels exhaust gas radially outward of the rotating nacelle via an angled exhaust nozzle to create a torque on the rotating nacelle, wherein the engine comprises a fan located at a position along the longitudinal axis of the engine upstream from the leg.

15. The engine of claim 7 further comprising one of a sliding gearbox, blade and an air inlet.

* * * * *